(12) United States Patent
Huang et al.

(10) Patent No.: US 7,359,466 B2
(45) Date of Patent: Apr. 15, 2008

(54) SIGNAL DETECTION BY A RECEIVER IN A MULTIPLE ANTENNA TIME-DISPERSIVE SYSTEM

(75) Inventors: Howard C Huang, New York, NY (US); Laurence Eugene Mailaender, New York, NY (US); Magnus Sandell, Swindon (GB); Harish Viswanathan, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 415 days.

(21) Appl. No.: 09/938,453

(22) Filed: Aug. 24, 2001

(65) Prior Publication Data

US 2003/0076908 A1 Apr. 24, 2003

(51) Int. Cl.
*H04B 1/10* (2006.01)
(52) U.S. Cl. ............... 375/349; 375/345; 375/350; 375/232
(58) Field of Classification Search .......... 375/220, 375/229–236, 267, 350, 347, 144, 346, 260, 375/148, 349; 370/208, 209, 210, 347, 342; 455/92; 714/794
See application file for complete search history.

(56) References Cited

U.S. PATENT DOCUMENTS

| | | | | |
|---|---|---|---|---|
| 5,550,810 | A | * | 8/1996 | Monogioudis et al. ...... 370/342 |
| 6,145,114 | A | * | 11/2000 | Crozier et al. ............. 714/794 |
| 6,314,147 | B1 | * | 11/2001 | Liang et al. ............... 375/346 |
| 6,574,211 | B2 | * | 6/2003 | Padovani et al. ........... 370/347 |
| 6,731,700 | B1 | * | 5/2004 | Yakhnich et al. ........... 375/341 |
| 6,785,341 | B2 | * | 8/2004 | Walton et al. ............. 375/267 |
| 6,795,508 | B1 | * | 9/2004 | Odenwalder et al. ....... 375/267 |
| 7,027,523 | B2 | * | 4/2006 | Jalali et al. ............... 375/296 |
| 2002/0126741 | A1 | * | 9/2002 | Baum et al. ............... 375/144 |
| 2003/0003880 | A1 | * | 1/2003 | Ling et al. ................ 455/92 |
| 2003/0035491 | A1 | | 2/2003 | Walton et al. ............. 375/267 |

FOREIGN PATENT DOCUMENTS

WO        WO 01/33761 A1        5/2001

OTHER PUBLICATIONS

Irfan Ghauri et al., "Linear Receivers for the DS-CDMA Downlink Exploiting Orthogonality of Spreading Sequences", *32nd Asilomar Conference*, Nov. 1-4, 1998, pp. 650-654.
J-K Hwang et al., "Performance Analysis Of MIMO-MMSE-DFE Multiuser Receiver For TDMA Mobile Systems With Spatial Diversity", *VTC 2001 Spring IEEE VTS 54RD Vehicular Technology Conferences*, Rhodes, Greece, May 6-9, 2001, CONF. 53, vol. 1 of 4, pp. 142-1456.

* cited by examiner

*Primary Examiner*—Phuong Phu

(57) ABSTRACT

In a MIMO system the bit error rate floor caused by time dispersion is reduced by employing a joint minimum mean square error (MMSE) equalizer for all of the respective transmit antenna—receive antenna pairings that are possible in the MIMO system. The resulting joint equalization compensates not only for the impact of the channel on the transmit antenna—receive antenna pairings but also for the interference of the other transmit antennas on any given receive antenna. The joint equalization outperforms simply replicating the prior art minimum mean square error (MMSE) equalizer for each transmit antenna—receive antenna pairings.

38 Claims, 9 Drawing Sheets

SIGNAL DETECTION BY A RECEIVER IN A MULTIPLE ANTENNA TIME-DISPERSIVE SYSTEM

TECHNICAL FIELD

This invention relates to the art of wireless communications, and more particularly, to wireless communication systems using multiple antennas at the transmitter and multiple antennas at the receiver, so called multiple-input multiple-output (MIMO) systems.

BACKGROUND OF THE INVENTION

It has previously been assumed for MIMO systems that the time dispersion between one or more of the transmit antennas and one or more of the receive antennas was negligible, i.e., the various paths were nonresolvable, as often occurs in low bandwidth systems, because the pulse width is longer than the channel time dispersion. However, it has been recognized that under typical urban (TU) conditions, i.e., the conditions of the so-called "TU" model, that the time dispersion between one or more of the transmit antennas and one or more of the receive antennas is non-negligible. Such a non negligible time dispersion causes the various paths to interfere with each other, resulting in a bit error rate floor, i.e., minimum, and so the resulting bit error rate is unacceptable.

I. Ghauri and D. Slock have shown, in "Linear Receivers for the DS-CDMA Downlink Exploiting Orthogonality of Spreading Codes", $32^{nd}$ Asilomar Conference, Nov. 1-4, 1998 pp. 650-4, that a minimum mean square error (MMSE) equalizer operating on received code division multiple access (CDMA) chips can be employed to compensate for time dispersion in a single transmit, single receive antenna system, thus reducing the bit error rate floor and improving performance.

SUMMARY OF THE INVENTION

We have recognized, in accordance with the principles of the invention, that in a MIMO system the bit error rate floor caused by time dispersion can be reduced by employing a joint equalizer for all of the respective transmit antenna—receive antenna pairings that are possible in the MIMO system. Advantageously, the resulting joint equalization compensates not only for the impact of the channel on the transmit antenna—receive antenna pairings but also for the interference of the other transmit antennas on any given receive antenna. In a particular embodiment of the invention, the joint equalizer is a joint minimum mean square error (MMSE) equalizer, and in such an embodiment the joint equalization outperforms simply replicating the prior art minimum mean square error (MMSE) equalizer for each transmit antenna—receive antenna pairing.

In one embodiment of the invention, which is especially useful for CDMA, after the equalization is completed the resulting chip streams, one for each transmit antenna, are despread in the conventional manner and then the resulting depread symbols may be further processed in the conventional manner. Alternatively, instead of further processing the despread symbols in the conventional manner, the despread symbols may be processed, in accordance with an aspect of the invention, so as to have their soft bits computed through the use of a posteriori probability (APP) metric. Prior to computing the soft bits, the despread symbols may be spatially whitened using a spatial whitening filter.

In another embodiment of the invention, which is also especially useful for CDMA, the equalizer is iteratively computed so that a symbol from one transmit antenna is determined during each iteration. Initially the received samples are stored in a memory. After a symbol for an antenna is determined, the received samples for each of the remaining antennas are then recomputed by subtracting out the determined symbol from the samples as they existed prior to determining the symbol. Once all the symbols for all of the transmit antennas are determined for a symbol period are determined the operation begins anew with the samples corresponding to the next symbol period.

DETAILED DESCRIPTION

Figure 1:
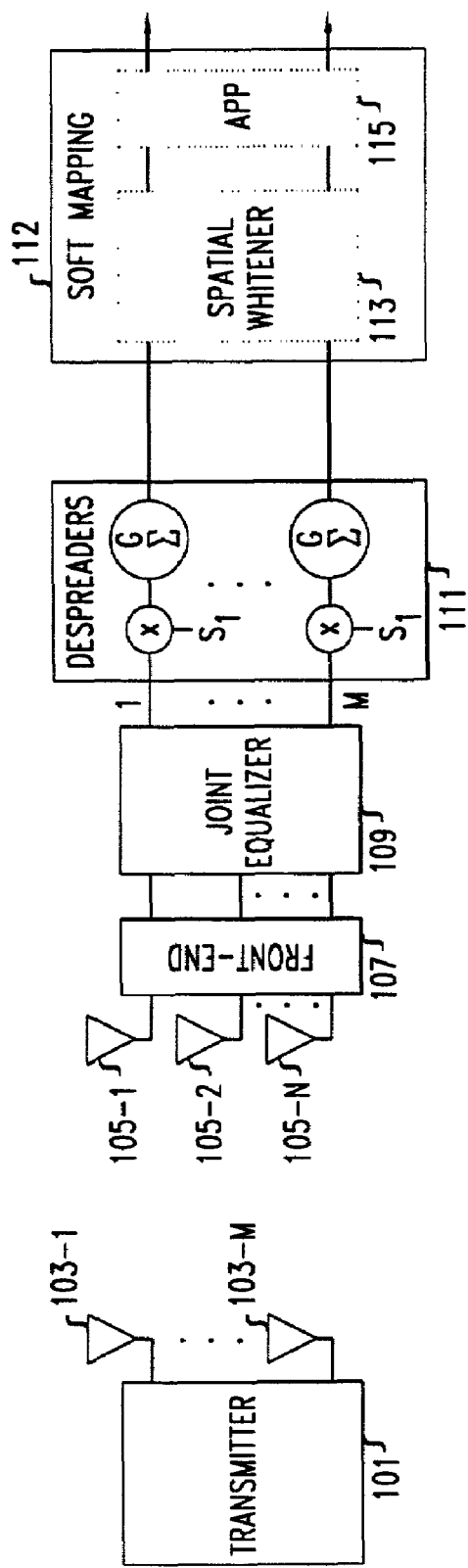
FIG. 1 shows an embodiment a multiple-input multiple-output (MIMO) wireless system in which the bit error rate floor caused by time dispersion is reduced by employing a joint minimum mean square error (MMSE) equalizer for all of the respective transmit antenna—receive antenna pairings that are possible in the MIMO system, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

In the description, identically numbered components within different ones of the FIGS. refer to the same components.

FIG. 1 shows an exemplary embodiment of a multiple-input multiple-output (MIMO) wireless system in which the bit error rate floor caused by time dispersion is reduced by employing a joint minimum mean square error (MMSE) equalizer for all of the respective transmit antenna—receive antenna pairings that are possible in the MIMO system, in accordance with the principles of the invention. Shown in FIG. 1 are a) transmitter 101; b) transmit antennas 103; including transmit antennas 103-1 through 103-M; c) receive antennas 105; including receive antennas 105-1 through 105-N; d) receiver front-end 107; e) joint equalizer 109; f) optional despreaders 111; g) soft bit mapper 112, which may include optional spatial whitening filter 113; and optional a posteriori probability (APP) metric processor 115.

Transmitter 101 is a MIMO transmitter, e.g., one in which an original data stream is divided into substreams and each resulting substream is transmitted as a modulated radio signal via an individual one of transmit antennas 103. The transmitted signals pass to the receiver over a time dispersive channel such that signals from each transmit antenna 103 reach each of receive antennas 105.

Receive antennas 105 convert the radio signals impinging upon them into electrical signals, which are supplied to receiver front-end 107. Receiver front-end 107 operates conventionally to produce a plurality of streams of binary numbers, each stream representing samples of the radio signals received at an associated one of antennas 105. Typically receiver front-end 107 performs radio frequency downconversion, filtering, sampling, and analog-to-digital conversion. The resulting samples are provided to joint equalizer 109.

Joint equalizer 109 compensates for the effects of the transmit signals from each of antennas 103 having passed through the channel as well as the interference that results from transmitting via multiple antennas simultaneously. The output of joint equalizer 109 is M, i.e., the number of transmit antennas, streams of corrected symbols, or in the case of CDMA, streams of corrected chips which when properly combined form symbols. Operation of joint equalizer 109 will be described more fully hereinbelow. If CDMA is employed, the output of joint equalizer 109 is supplied to optional despreaders 111, which produces symbols from the stream of chips supplied by joint equalizer 109.

The symbols produced may then be further processed in the conventional manner for a MIMO system, e.g., soft bits may be developed by soft bit mapper 112 for use in a decoder, e.g., the well known "Turbo decoder". Alternatively, the symbols may be supplied within soft bit mapper 112 to optional spatial whitening filter 113, which makes the noise equal on each branch. Note that the whitening is performed only in the space domain. If whitening is performed in the time domain some temporal dispersion will be introduced into the signal. The symbols, or whitened symbols if optional spatial whitening filter 113 is employed, may further be supplied to optional a posteriori probability (APP) metric processor 115 within soft bit mapper 112, in accordance with an aspect of the invention. APP metric processor 115 performs a particular type of mapping from symbols to soft bits. Operation of APP metric processor 115 is described more fully hereinbelow.

Figure 2:
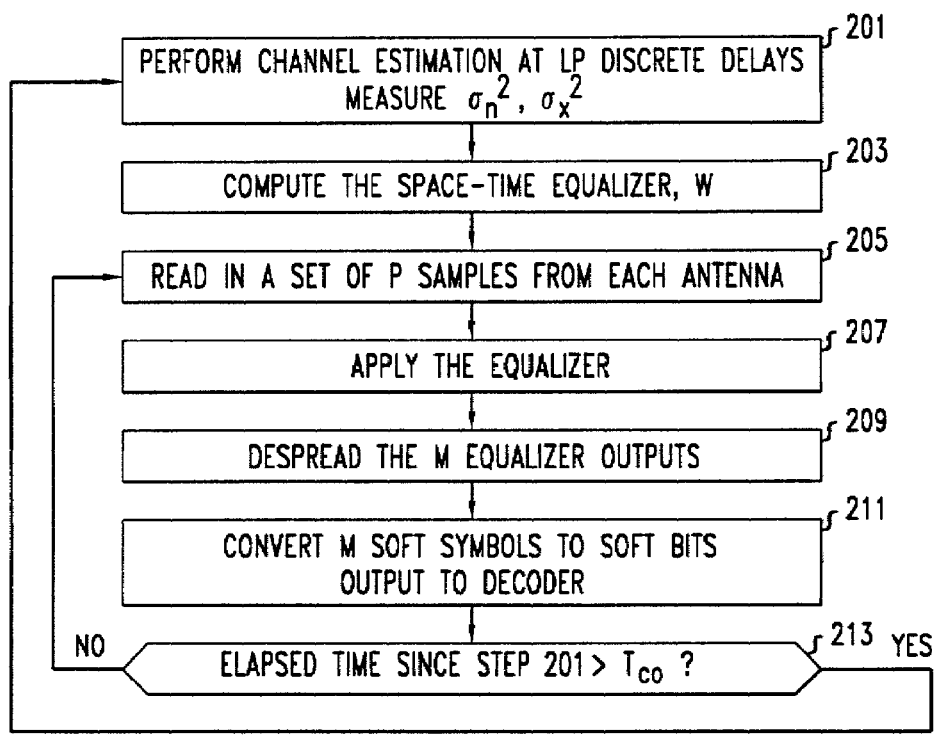
FIG. 2 shows an exemplary process, in flow chart form, for the overall operation of system of FIG. 1.

FIG. 2 shows an exemplary process, in flow chart form, for the overall operation of system of FIG. 1. Prior to performing the process of FIG. 2, initial values of parameters M, N, L, P, E, and d must be determined. What each of these parameters represents is listed in Table 1. Additionally, prior to performing the process of FIG. 2 it is necessary to determine noise covariance $R_{pp}$, which contains samples of the autocorrelation of the chip pulse shape r(t), when CDMA is employed, or the symbol pulse shape autocorrelation, when CDMA is not employed.

TABLE 1

Parameter Definitions

| | |
|---|---|
| M | number of transmit antennas |
| N | number of receive antennas |
| L | length of the channel impulse response (chips) |
| P | over-sampling factor |
| E | length of the equalizer (chips) |
| d | equalizer delay (chips) |
| $\sigma_n^2$ | power of interference + noise (RF bandwidth) |
| $\sigma_x^2$ | power of downlink signal (RF bandwidth) |
| G | Number of CDMA chips per symbol |

The process of FIG. 2 is executed periodically, with a periodicity that preferably does not exceed the coherence time, $T_{co}$, which is the time duration for which the channel properties are substantially constant. The process is entered in step 201, in which L*P discrete channel estimations $h_o$ to $h_{LP-1}$ are developed. The channel estimate may be obtained using any conventional technique, e.g., by using correlators tuned to the pilot channel. Each of discrete channel estimations is taken with a time spacing of the chip duration divided by P, for CDMA, or symbol duration divided by P for TDMA. Also, in step 201, the background noise plus interference power $\sigma_n^2$ and the power of the downlink from the base station to the terminal $\sigma_x^2$ are determined in the conventional manner. In step 203, the weights employed by joint equalizer 109 are determined, as will be described fully further hereinbelow.

Next, in step 205, a set of P samples from each antenna is obtained. Thereafter, in step 207, the determined weights of joint equalizer 109 are applied to the samples from each antenna by joint equalizer 109. The samples are then despread by despreader 111, if CDMA was employed, in optional step 209. In optional step 211, conventional soft mapping of the symbols to soft bits is performed, and the resulting soft bits are supplied as an output for use by a decoder. Thereafter, conditional branch point 213 tests to determine whether one coherence time has elapsed since the previous execution of step 201. If the test result in step 213 is NO, indicating that the channel is believed to still remain substantially the same as when it was last estimated, control passes to step 205, and the process continues as described above. If the test result in step 213 is YES, indicating that sufficient time has passed such that the channel may have changed enough so as not to be considered substantially the same as when it was last estimated, control passes back to step 201 and the process continues as described above.

Figure 3:
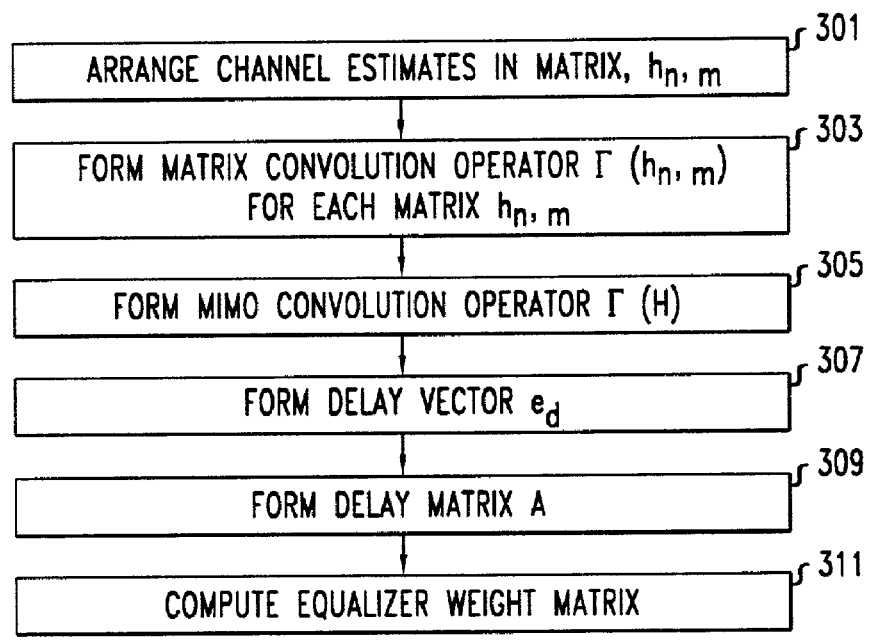
FIG. 3 shows in more detail the process by which the weights employed by the joint equalizer of FIG. 1 are determined.

FIG. 3 shows in more detail the process of step 203 by which the weights employed by joint equalizer 109. Note that the process requires the use of several matrices, and the dimensions of the various matrices are given in Table 2.

TABLE 2

| Matrix | Dimension |
|---|---|
| $R_p$ | EP × EP |
| $R_{pp}$ | NEP × NEP |
| $\Gamma(h_{n,m})$ | EP × (E + L − 1) |
| $\Gamma(H)$ | NEP × M(E + L − 1) |
| $\Gamma(H_m)$ | NEP × M(E + L − 1) |
| $e_d$ | (E + L − 1) × 1 |
| A | M × M(E + L − 1) |
| $a_m$ | 1 × M(E + L − 1) |
| W | M × NEP |
| $w_m$ | 1 × NEP |
| Q | M × M |

In step 301, the channel estimates $h_o$ to $h_{LP-1}$ for each transmit and receive pair obtained in step 201 are arranged in a respective matrix $h_{n,m}$ as shown in equation 1. In step 303, matrix convolution operator $\Gamma(h_{n,m})$ is then formed for each respective matrix $h_{n,m}$, as shown in equation 2. Thereafter, in step 305, MIMO convolution operator $\Gamma(H)$ is then formed from the various matrix convolution operators as shown in equation 3.

$$h_{n,m} = \begin{bmatrix} h_0 & h_P & \cdots & h_{(L-1)P} \\ \vdots & \vdots & & \vdots \\ h_{P-1} & h_{2P-1} & \cdots & h_{LP-1} \end{bmatrix} \qquad \text{equation (1)}$$

$$\Gamma(h_{n,m}) = \begin{bmatrix} h_{n,m} & 0_p & \cdots & 0_p \\ 0_p & & & \\ \vdots & & \ddots & \vdots \\ 0_p & \cdots & 0_p & h_m \end{bmatrix} \qquad \text{equation (2)}$$

$$\Gamma(H) = \begin{bmatrix} \Gamma(h_{1,1}) & \Gamma(h_{1,2}) & \cdots & \Gamma(h_{1,M}) \\ \Gamma(h_{2,1}) & \Gamma(h_{2,2}) & & \vdots \\ \vdots & & \ddots & \\ \Gamma(h_{N,1}) & \cdots & & \Gamma(h_{N,M}) \end{bmatrix} \qquad \text{equation (3)}$$

In step 307, delay vector $e_d$ is formed as shown in equation 4. Delay vector $e_d$ is a one dimensional vector with E+L−1 elements which are all zero except for the single value at the E+L−1−d location, which has a value of 1. A typical value for d, which is selectable by the implementor, is such that the location which has a value of 1 is at the center of the vector. The purpose of delay vector $e_d$, is to impose the overall equalizer delay d onto the equalizer. Thereafter, in step 309, delay matrix A is computed from equation 5, in which $I_M$ is an identity matrix of size M×M.

$$e_d = [0 \ldots 1 0 0] \qquad \text{equation (4)}$$

$$A = I_M \oplus e_d \qquad \text{equation (5)}$$

Finally, in step 311, equalizer weight matrix, W, is computed in accordance with equation 6, in which $X^H$ means the Hermitian transpose of X, which is the complex conjugate transpose of the vector or matrix X.

$$W = A\Gamma(H)^H \left( \Gamma(H)^H \Gamma(H) + \frac{\sigma_n^2}{\sigma_x^2} R_{PP} \right)^{-1} \qquad \text{equation (6)}$$

In one embodiment of the invention, execution of step 205 is such that the P samples r of antenna n are initially arranged as a vector c shown in equation 7, where k is the current received chip time index if CDMA is employed, or the symbol time index if CDMA is not employed. E consecutive in time vectors c for antenna n are then arranged as shown in equation 8, and the E consecutive in time vectors c for all of the N antennas are further arranged as shown in equation 9, forming a vector of received samples at time k.

$$c_n(k) = \begin{bmatrix} r_n(kT_c) \\ r_n(kT_c + T_s) \\ \vdots \\ r_n(kT_c + (P-1)T_s) \end{bmatrix} \qquad \text{equation (7)}$$

$$r_n(k) = \begin{bmatrix} c_n(k) \\ c_n(k-1) \\ \vdots \\ c_n(k-E+1) \end{bmatrix} \quad \text{equation (8)}$$

$$r(k) = \begin{bmatrix} r_1(k) \\ r_2(k) \\ \vdots \\ r_N(k) \end{bmatrix} \quad \text{equation (9)}$$

The application of the determined weights by joint equalizer 109 in step 207 may be performed as shown in equation 10, where y(k) is a resulting vector of size M×1 which contains the equalized chips if CDMA is employed, or symbols if CDMA is not employed.

$$y(k) = Wr(k) \quad \text{equation (10)}$$

Figure 4:
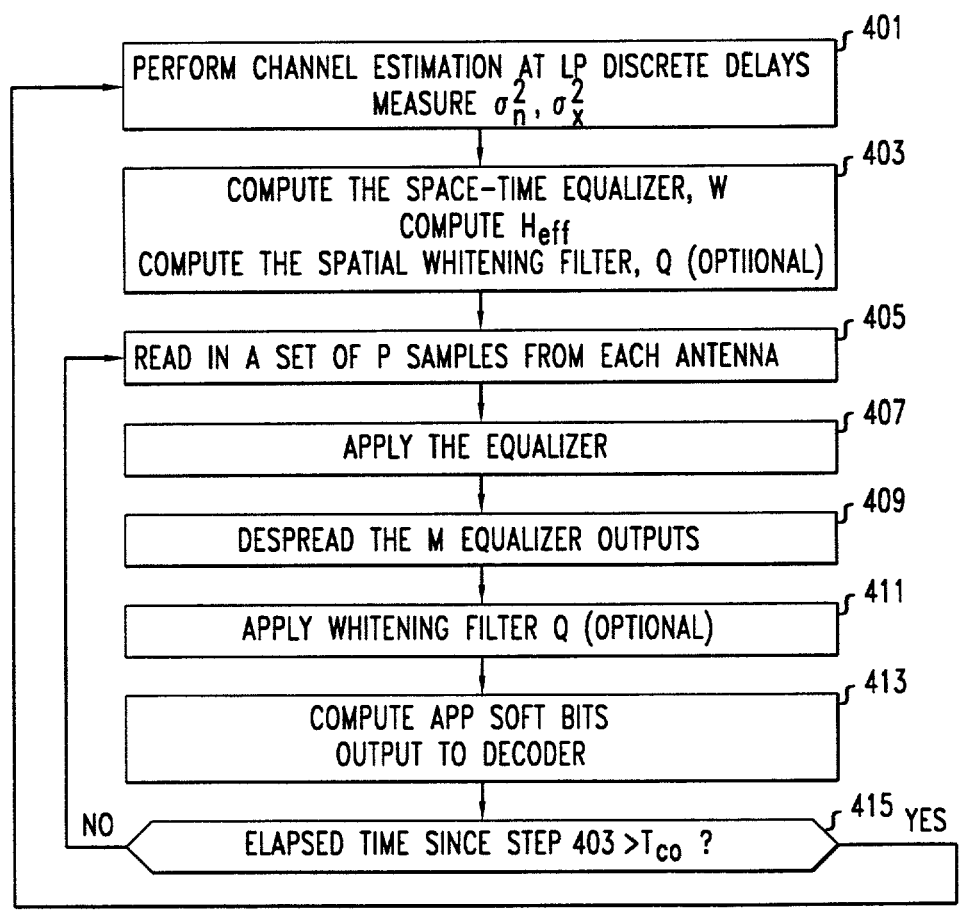
FIG. 4 shows another exemplary process, in flow chart form, for the overall operation of system of FIG. 1.

FIG. 4 shows another exemplary process, in flow chart form, for the overall operation of system of FIG. 1. The version of the process shown in FIG. 4 is similar to that shown in FIG. 2, but it is for embodiments of the invention that include optional spatial whitening filter 113 (FIG. 1) and optional a posteriori probability (APP) metric processor 115. Unless otherwise noted, all variables and parameters employed in the process of FIG. 4 are the same as described for FIG. 2. As with the process of FIG. 2, prior to performing the process of FIG. 4, initial values of parameters M, N, L, P, E, and d must be determined. Additionally, prior to performing the process of FIG. 4 it is necessary to determine $R_{pp}$.

The process of FIG. 4 is executed periodically, with a periodicity that preferably does not exceed the coherence time, $T_{co}$, which is the time duration for which the channel properties are substantially constant. The process is entered in step 401, in which L*P discrete channel estimations $h_o$ to $h_{LP-1}$ are developed. Also in step 401, the background noise plus interference power $\sigma_n^2$ and the power of the downlink from the base station to the terminal $\sigma_x^2$ are determined in the conventional manner. In step 403, the weights W employed by joint equalizer 109 are determined, as described hereinabove. Additionally, in step 403, the effective channel matrix $H_{eff}$ and, optionally, spatial whitening filter Q are determined, in accordance with an aspect of the invention. More specifically, $H_{eff}$ is determined as shown in equation 11, and Q is determined as shown in equation 12.

$$H_{eff}(m,n) = e_n^T WT(H) e_m \quad m=1:M, \; n=1:N \quad \text{equation (11)}$$

$$Q = (WW^H)^{-1/2} \quad \text{equation (12)}$$

Next, in step 405 a set of P samples from each antenna is obtained. Thereafter, in step 407, the determined weights of joint equalizer 109 are applied to the samples from each antenna by joint equalizer 109. The samples are then despread by despreader 111, if CDMA was employed, in optional step 409. In step 411, whitening filter Q is applied to the despread, equalizer outputs of step 409. In step 413, APP softbits are computed, in accordance with an aspect of the invention, using equations 13 and 14. The softbits are the output of the process of FIG. 4, and they may be made available to a decoder, e.g., a turbo decoder.

$$L_D(x_k \mid y) = \log_e\left(\frac{Pr(x_k = 1 \mid y)}{Pr(x_k = -1 \mid y)}\right) \quad \text{equation 13}$$

$$= \ln\left(\frac{\sum_{\hat{x}, x_k=1} p(y \mid X = \hat{x}) \prod_{j \neq k} p(X = x_j)}{\sum_{\hat{x}, x_k=-1} p(y \mid X = \hat{x}) \prod_{j \neq k} p(X = x_j)}\right) +$$

$$\ln\left(\frac{p(x_k = 1)}{p(x_k = -1)}\right)$$

$$p(y \mid X = x_k) = \left(\frac{1}{\sqrt{2\pi}\,\sigma}\right)^{N_r} \exp\left(-\frac{\|y - H_{eff}\hat{s}\|^2}{2\sigma^2}\right) \quad \text{equation 14}$$

Thereafter, conditional branch point 415 tests to determine whether one coherence time has elapsed since the previous execution of step 401. If the test result in step 415 is NO, indicating that the channel is believed to still remain substantially the same as when it was last estimated, control passes to step 405, and the process continues as described above. If the test result in step 415 is YES, indicating that sufficient time has passed such that the channel may have changed enough so as not to be considered substantially the same as when it was last estimated, control passes back to step 401 and the process continues as described above.

Figure 5:
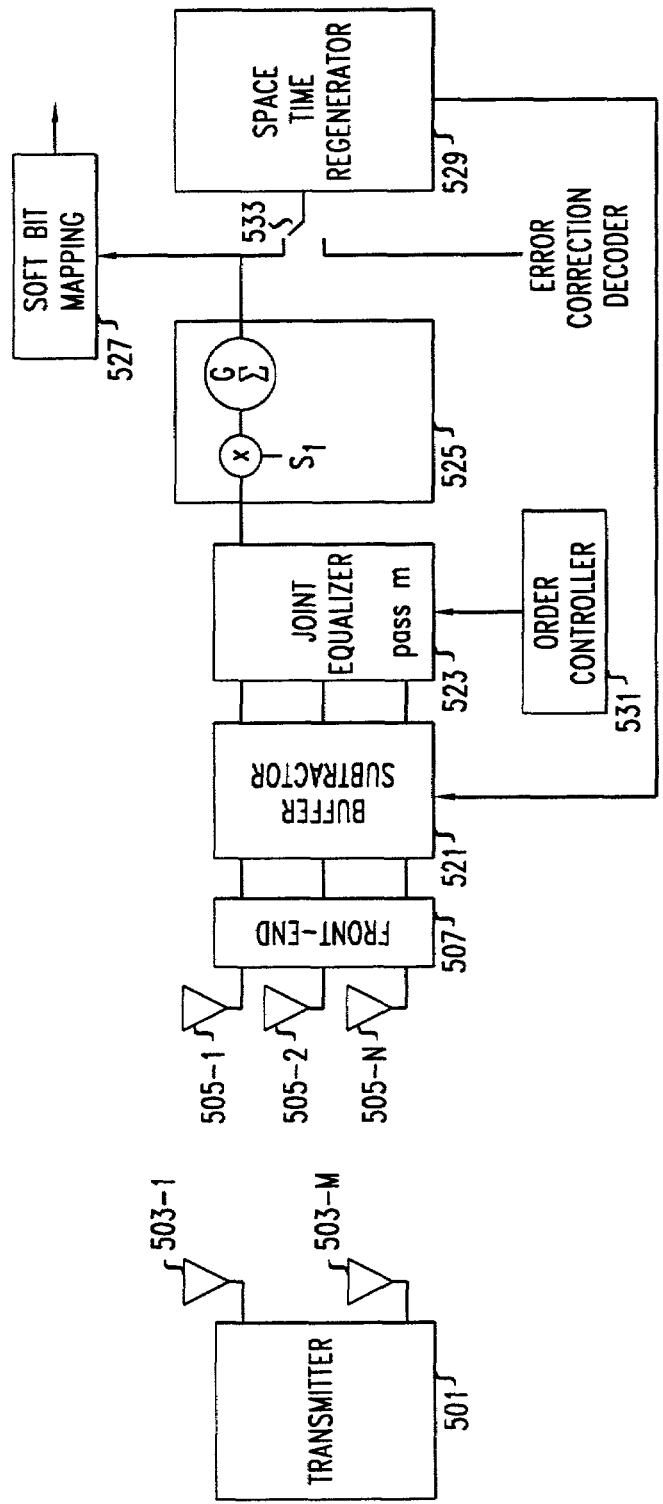
FIG. 5 shows another embodiment a multiple-input multiple-output (MIMO) wireless system in which the bit error rate floor caused by time dispersion is reduced by employing a joint minimum mean square error (MMSE) equalizer for all of the respective transmit antenna—receive antenna pairings that are possible in the MIMO system, in accordance with the principles of the invention.

FIG. 5 shows another exemplary embodiment of a multiple-input multiple-output (MIMO) wireless system in which the bit error rate floor caused by time dispersion is reduced by employing a joint minimum mean square error (MMSE) equalizer for all of the respective transmit antenna—receive antenna pairings that are possible in the MIMO system, in accordance with the principles of the invention. Shown in FIG. 5 are a) transmitter 501; b) transmit antennas 503; including transmit antennas 503-1 through 503-M; c) receive antennas 505; including receive antennas 505-1 through 505-N; d) receiver front-end processor 507; e) buffer-subtractor 521; f) joint equalizer 523; g) optional despreader 525; h) soft bit mapper 527; i) space-time regenerator 529; j) order controller 531 and k) switch 533.

Transmitter 501 is a MIMO transmitter, e.g., one in which an original data stream is divided into substreams and each resulting substream is transmitted as a modulated radio signal via an individual one of transmit antennas 503. The transmitted signals pass to the receiver over a time dispersive channel such that signals from each transmit antenna 503 reach each of receive antennas 505.

Receive antennas 505 convert the radio signals impinging upon them into electrical signals, which are supplied to receiver front-end processor 507. Receiver front-end processor 507 operates conventionally to produce a stream of binary numbers representing samples of the radio signals received at antennas 505. Typically receiver front-end processor 507 performs radio frequency downconversion, filtering, sampling, and analog-to-digital conversion. The resulting samples are provided to buffer-substractor 521.

Figure 6:
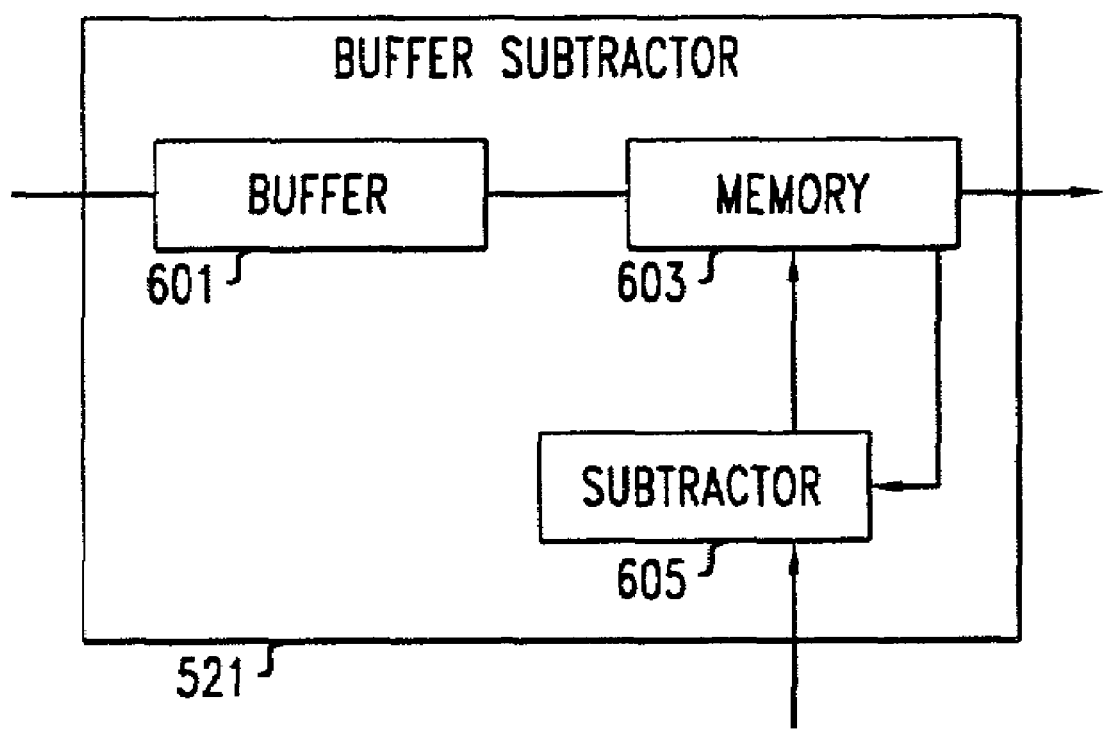
FIG. 6 shows a more detailed version of a buffer-subtractor of FIG. 5.

Buffer-subtractor 521 is shown in more detail in FIG. 6. Buffer subtractor 521 includes buffer 601, memory 603, and subtractor 605. Buffer 601 stores a time consecutive set of samples from each of antennas 505 as those samples become available from front-end processor 507. Buffer 601 supplies the samples it receives from front-end processor 507 to memory 603 when an entire set is stored, i.e., the contents of buffer 601 are quickly dumped to memory 603. Once the set of samples are stored in memory 603 they may be independently accessed and sent to joint equalizer 523 (FIG. 5). Additionally, space time samples from a second input of buffer-subtractor 521 are supplied to subtractor 605. Subtractor 605 is cable of forming the difference between a specified location in memory 603 and a second input to buffer-subtractor 521. The resulting difference is stored in the specified location in memory 603.

Joint equalizer 523 performs M passes through memory 603 with a different equalizer weight $w_m$ in each pass. Each weight is chosen to emphasize transmit antenna m and to suppress transmit antennas m+1 through M.

The output of joint equalizer 523 is supplied to conventional soft bit mapper 527, via optional conventional despreader 525 if CDMA is employed. The soft bits developed by soft bit mapper 527 are then supplied as an output, such as may be used by a decoder, e.g., the well known "Turbo decoder".

The same output that is supplied to conventional soft bit mapper 527 may also be supplied to space-time regenerator 529 via switch 533. Space-time regenerator 529 forms a set of time consecutive samples for each receive antenna assuming the soft symbol is correct. In other words, assuming a particular soft symbol had been the actual symbol transmitted by a particular transmit antenna, space-time regenerator 529 creates the corresponding effect that such a symbol would have caused on each of receive antennas 505 given the channel characteristics. Operation of space-time regenerator 529 will be explained more fully hereinbelow.

Order controller 531 determines, based on channel estimates, the signal from which transmit antenna will be processed at any particular time, as will be explained more fully hereinbelow.

Figure 7:
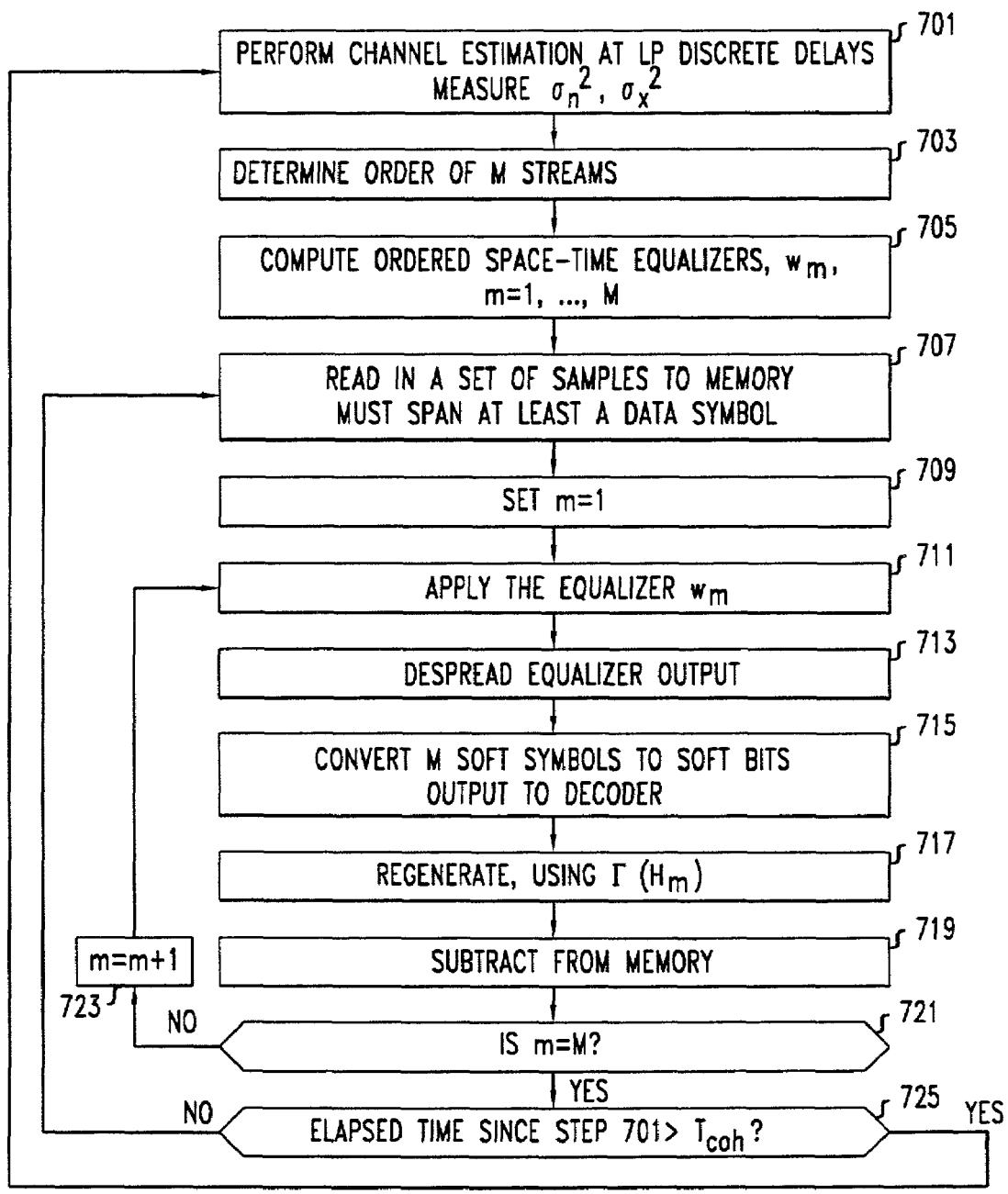
FIG. 7 shows an exemplary process, in flow chart form, for the overall operation of system of FIG. 5.

FIG. 7 shows an exemplary process, in flow chart form, for the overall operation of system of FIG. 5 in which switch 533 is connected between despreader 525 and space-time regenerator 529. Prior to performing the process of FIG. 7, initial values of parameters M, N, L, P, E, and d must be determined. What each of these parameters represents is listed in Table 1. Additionally, prior to performing the process of FIG. 7 it is necessary to determine $R_{pp}$, which is samples of the autocorrelation of the chip pulse shape r(t), when CDMA is employed, or the symbol pulse shape autocorrelation, when CDMA is not employed.

The process of FIG. 7 is executed periodically, with a periodicity that preferably does not exceed the coherence time, $T_{co}$. The process is entered in step 701, in which L*P discrete channel estimations $h_o$ to $h_{LP-1}$ are developed. The channel estimate may be obtained using any conventional technique, e.g., by using correlators tuned to the pilot channel. Each discrete channel estimation is taken with a time spacing of the chip duration divided by P, for CDMA, or symbol duration divided by P for TDMA. Also in step 701, the background noise plus interference power $\sigma_n^2$ and the power of the downlink from the base station to the terminal $\sigma_x^2$ are determined in the conventional manner.

In step 703, order controller 531 determines, according to equations 15 and 16, the order in which the signals from the various transmit antennas will be processed, with the signal from a respective transmit antenna being processed for each execution of joint equalizer 523. Sort is a function that rearranges the elements of vector P so that they run from largest to smallest and order is a list of all the antenna transmit antenna numbers as they should be processed by joint equalizer 523. It is preferable to process the so-called "strong" signals first. However, the particular characteristic, or set of characteristics, which are used to define the "strength" of a signal is at the discretion of the implementer. In the particular embodiment shown herein, estimated signal powers are employed as the strength. Further note that although herein the order for all the antennas is determined simultaneously, those of ordinary skill in the art will readily recognize that it is possible to successively determine which antenna to process.

$$P = \|\text{diag}(W\Gamma(H))\|^2 \qquad \text{equation (15)}$$

$$[P',\text{order}] = \text{sort}(P) \qquad \text{equation (16)}$$

In step 705, the equalizer weights for the particular antenna currently being processed, m, as specified by the order, is determined according to equations 17 and 18, in which delay vector $a_m$ is the $m^{th}$ row of delay matrix A which was described hereinabove.

$$w_m = a_m \Gamma(H_m)^H \left( \Gamma(H_m)^H \Gamma(H_m) + \frac{\sigma_n^2}{\sigma_x^2} R_{pp} \right)^{-1} \qquad \text{equation (17)}$$

$$\Gamma(H_m) = \begin{bmatrix} 0 & \Gamma(h_{1,2}) & 0 & \cdots & \Gamma(h_{1,M}) \\ 0 & \Gamma(h_{2,2}) & 0 & & \vdots \\ \vdots & \vdots & \vdots & & \vdots \\ 0 & \Gamma(h_{N,2}) & 0 & \cdots & \Gamma(h_{N,M}) \end{bmatrix} \qquad \text{equation (18)}$$

Note that for each iteration m of equation 18, columns corresponding to order(1) through order(m−1) are set to the block zero matrix 0. Note that order is vector which contains a listing of the M antenna numbers in the order in which they will be processed. Order may be the result of the well known function sort of MatLab®. Doing so accounts for the fact that signals from transmit antennas 1 through m−1 have already been subtracted from the signal remaining to be processed for this set of samples.

Next, in step 707 a set of samples that span at least the duration of a data symbol is obtained from each receive antenna. Thereafter, in step 709, counter variable m is initialized to 1. In step 711, the weights determined for joint equalizer 523 in step 705 are applied to the samples from each receive antenna by joint equalizer 523, in accordance with equation 19.

$$y(k) = W_m^T r(k) \qquad \text{equation (19)}$$

The samples are then despread by despreader 525, if CDMA was employed, in optional step 713. In optional step 715, conventional soft mapping of the symbols to soft bits is performed, and the resulting soft bits are supplied as an output for use by a decoder.

In step 717, samples are produced by space-time regenerator 529 according to equations 20 and 21.

$$\hat{x}_m(k) = \hat{d}_m(k) \begin{bmatrix} s(kG) \\ s(kG+1) \\ \vdots \\ s(kG+G-1) \end{bmatrix} \qquad \text{equation (20)}$$

$$y_m(k) = \begin{bmatrix} \Gamma(h_{1,m}) \\ \Gamma(h_{2,m}) \\ \vdots \\ \Gamma(h_{N,m}) \end{bmatrix} \hat{x}_m(k) \qquad \text{equation (21)}$$

In step 719 the output of space-time regenerator 529 is subtracted from the contents of memory 603 (FIG. 6), as shown by equation 22.

$$r(k)=r(k)-y_m(k) \quad \text{equation (22)}$$

Thereafter, conditional branch point 721 tests to determine if m is equal to M. If the test result in step 721 is NO, indicating that not all of the transmit antennas have yet had their signal contribution processed, m is incremented in step 723. Thereafter, control passes back to step 711 and the process continues as described above. If the test result in step 712 is YES, indicating that all of the transmit antennas have had their signal contribution processed, control passes to conditional branch point 725, which tests to determine whether one coherence time has elapsed since the previous execution of step 701. If the test result in step 725 is NO, indicating that the channel is believed to still remain substantially the same as when it was last estimated, control passes to step 707, and the process continues as described above. If the test result in step 725 is YES, indicating that sufficient time has passed such that the channel may have changed enough so as not to be considered substantially the same as when it was last estimated, control passes back to step 701 and the process continues as described above.

In an alternative configuration of FIG. 5, switch 533 is connected to the output of an error correction decoder which is either directly or indirectly connected to soft bit mapping 527. Doing so may improve performance.

Figure 8:
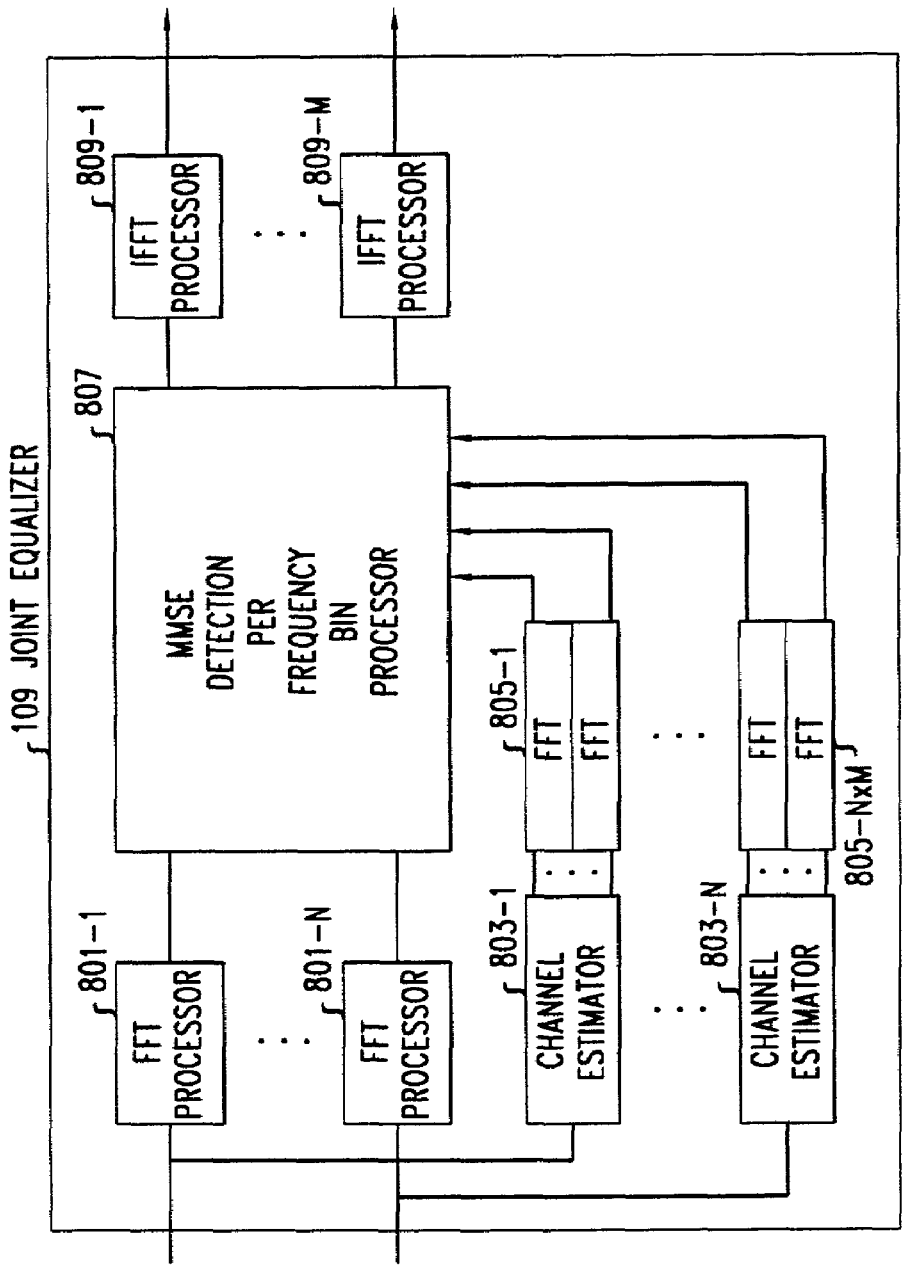
FIG. 8 shows a particular embodiment of the joint equalizer of FIG. 1, in which the equalization is performed in the discrete frequency domain, in accordance with an aspect of the invention.

FIG. 8 shows a particular embodiment of joint equalizer 109, in which the equalization is performed in the discrete frequency domain, in accordance with an aspect of the invention. Shown in FIG. 8 making up joint equalizer 109 are a) fast Fourier transform (FFT) processors 801, including EFT processors 801-1 through 801-N, where N is the number of receive antennas; b) channel estimators 803, including channel estimators 803-1 through 803-N; c) fast Fourier transform (FFT) processors 805, including FFT processors 805-1 through 805-N*M, where M is the number of transmit antennas; d) MMSE detection per frequency bin processor 807; and e) inverse fast Fourier transform (IFFT) processors 809, including IFFT processors 809-1 through 809-M.

Each of FFT processors 801 receives from front-end 107 a signal of time domain digital samples corresponding to a respective one of receive antennas 105-N and performs the FFT algorithm on a set of consecutive samples to convert the time domain samples to samples in the discrete frequency domain, $r_n(\omega)$, where $\omega$ is a particular discrete frequency. The number of samples F is at the discretion of the implementer based on a tradeoff between the performance and complexity of FFT processors 801. Typically the number of samples is a power of 2, e.g., 128, although the more samples the more accurate the equalization process will be. The possible values for $\omega$ are determined as $$\omega = \frac{2\pi n}{T_s F},$$

where n ranges from 0 to F−1. The resulting discrete frequency samples for each receive antenna are supplied to MMSE detection per frequency bin processor 807.

Each of channel estimators 803 also receives from front-end 107 a signal of time domain digital samples corresponding to a respective one of receive antennas 105-N and performs a channel estimate for the channel between its respective receive antenna and each of the M transmit antennas, thereby producing M channel estimates. Each channel estimate is a series of complex numbers that defines the impulse response of the channel. Fast Fourier transform (FFT) processors 805 each converts a respective channel estimate into the discrete frequency domain representation thereof, and supplies the resulting discrete frequency domain representation of the channel estimates $h_{n,m}(\omega)$ to MMSE detection per frequency bin processor 807.

MMSE detection per frequency bin processor 807 performs the equalization in the frequency domain by computing $$z(\omega)=(H(\omega)^H H(\omega)+\sigma^2 I)^{-1} H(\omega)^H r(\omega) \quad \text{equation (23)}$$

where $$H(\omega) = \begin{bmatrix} h_{1,1}(\omega) & \cdots & h_{1,M}(\omega) \\ \vdots & \ddots & \vdots \\ h_{N,1}(\omega) & \cdots & h_{N,M}(\omega) \end{bmatrix} \quad \text{equation (24)}$$

$$r(\omega) = \begin{bmatrix} r_1(\omega) \\ r_2(\omega) \\ \vdots \\ r_N(\omega) \end{bmatrix} \quad \text{equation (25)}$$

$$\sigma^2 = \frac{\sigma_n^2}{\sigma_x^2}, \quad \text{equation (26)}$$

$\sigma_n^2$ is the background noise plus interference power,
$\sigma_x^2$ is the power of the downlink signal from the base station to the terminal, and
I is the identity matrix.

Each of the resulting M components of resulting vector $z(\omega)$ are then inverse frequency transformed from the discrete frequency domain into the time domain by inverse fast Fourier transform (IFFT) processors 809. The time domain equalized outputs are then supplied as the output of joint equalizer 109.

Figure 9:
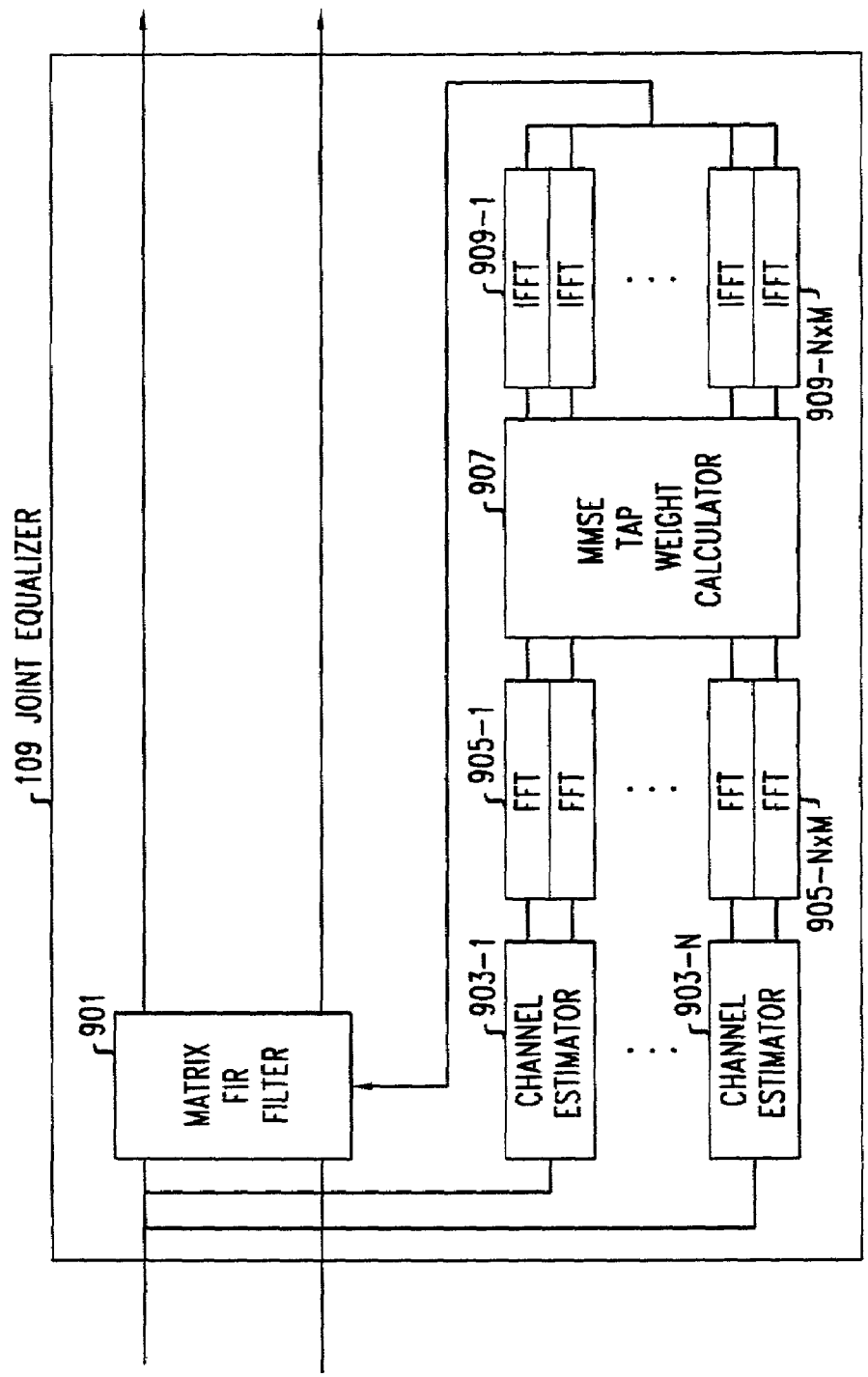
FIG. 9 shows a particular embodiment of the joint equalizer of FIG. 1, in which the equalization is calculated in the discrete frequency domain and applied in the time domain.

FIG. 9 shows a particular embodiment of joint equalizer 109 in which the equalization is calculated in the discrete frequency domain and applied in the time domain, in accordance with an aspect of the invention. Shown in FIG. 9 making up joint equalizer 109 are a) matrix finite impulse response (FIR) filter 901; b) channel estimators 903, including channel estimators 903-1 through 903-N; c) fast Fourier transform (FFT) processors 905, including FFT processors 905-1 through 905-N*M, where M is the number of transmit antennas; d) MMSE tap weight calculator 907; and e) inverse fast Fourier transform (IFFT) processors 909, including IFFT processors 909-1 through 909-N*M Matrix finite impulse response (FIR) filter 901 continuously receives from front-end 107 a signal of time domain digital samples corresponding to a respective one of receive antennas 105-N. The number of taps of matrix FIR filter 901 is at the discretion of the implementer based on a tradeoff between performance and complexity. Typically the number of samples is a power of 2, e.g., 128.

Each of channel estimators 903 also receives from front-end 107 a signal of time domain digital samples corresponding to a respective one of receive antennas 105-N and performs a channel estimate for the channel between its respective receive antenna and each of the M transmit antennas, thereby producing M channel estimates. Each channel estimate is a series of complex numbers that defines the impulse response of the channel. Fast Fourier transform (FFT) processors 905 each converts a respective channel estimate into the discrete frequency domain, and supplies the resulting discrete frequency domain representation of the channel estimates $h_{n,m}(\omega)$ to MMSE tap weight calculator 907. The number of samples employed by FFT processors 905 for each conversion should be the same as the number of taps in matrix FIR filter 901.

MMSE tap weight calculator 907 develops frequency domain representations of the weights necessary to perform the equalization in the time domain by computing $$S(\omega)=(H(\omega)^H H(\omega)+\sigma^2 I)^{-1} H(\omega)^H \qquad \text{equation (27)}$$

where $H(\omega)$, $\sigma^2$ are defined as explained hereinabove in connection with FIG. 8.

Each of the resulting M components of resulting vector $S(\omega)$ are grouped by frequency into frequency vectors, and are then the frequency vectors are inverse frequency transformed from the discrete frequency domain to become filter weights in the time domain by inverse fast Fourier transform (IFFT) processors 909. The weights are then supplied to matrix FIR filter 901 which utilizes them to perform equalization in the time domain on the signals received from front-end 107 as shown by equation 28, $$y(k) = \sum_{j=0}^{F-1} S_j r(k-j) \qquad \text{equation (28)}$$

where y (k) is the vector output at time k, y having M components—one for each transmit antenna—, $S_j$ is the M×N filter matrix for delay j, which is the inverse Fourier transform of $S(\omega)$, r(k) is the vector input signal which is received by matrix FIR filter 901 as defined in equation (9), and F is the number of samples taken for each FFT.

Given the foregoing, those of ordinary skill in the art will readily recognize that other equalizer algorithms which approximate the operation and performance of MMSE, such as least mean square (LMS), recursive least squares (RLS), or minimum intersymbol interference (ISI) subject to an anchor condition, can be employed in a joint manner, e.g., in a space manner, in the implementation of joint equalizer 109.

Those of ordinary skill in the art will readily recognize that the techniques of the instant invention may be employed in systems in which the various transmit antennas are transmitting at different data rates, e.g., using different encoding rates and/or transmit constellations, such as quaternary phase-shift keying (QPSK) or 16-ary quadrature amplitude modulation (16-QAM). In such a situation, if the embodiment of FIG. 5 is employed, order controller 531 is not required because the antennas must always be processed in an a priority determined order.

What is claimed is:

1. A method for compensating for time dispersion in a receiver of a wireless system that has a plurality of transmit antennas and a plurality of receive antennas, the method comprising the steps of:
   receiving samples for each receive antenna;
   determining a joint equalizer solution using channel information for at least one pairing of at least one of said transmit antennas and said receive antennas and said received samples of at least two of said receive antennas; and
   applying said determined joint equalizer solution to said received samples from at least one of said receive antennas to develop equalized samples;
   wherein said step of determining a joint equalizer solution is performed at least partly in the discrete frequency domain.

2. The invention as defined in claim 1 wherein said joint equalizer solution is a joint minimum mean square error (MMSE) solution.

3. The invention as defined in claim 1 further comprising the step of estimating a channel for said at least one pairing of at least one of said transmit antennas and said receive antennas.

4. The invention as defined in claim 1 said step of applying said determined joint equalizer solution is performed in the frequency domain.

5. A method for compensating for time dispersion in a receiver of a wireless system that has a plurality of transmit antennas and a plurality of receive antennas, the method comprising the steps of:
   receiving samples for each receive antenna;
   determining a joint equalizer solution using channel information for at least one pairing of at least one of said transmit antennas and said receive antennas and said received samples of at least two of said receive antennas;
   applying said determined joint equalizer solution to said received samples from at least one of said receive antennas to develop equalized samples; and
   despreading said equalized samples.

6. The invention as defined in claim 1 wherein at least two of said transmit antennas transmit at different rates.

7. The invention as defined in claim 1 wherein at least two of said transmit antennas transmit using different transmit constellations.

8. The invention as defined in claim 1 further comprising the step of performing soft mapping using a version of said equalized samples.

9. The invention as defined in claim 8 wherein said version of said equalized samples are despread samples.

10. The invention as defined in claim 8 wherein said step of performing soft mapping further comprises the step of spatial whitening said version of said equalized samples.

11. The invention as defined in claim 8 herein said step of performing soft mapping further comprises the step of performing a posteriori probability (APP) metric processing an said version of said equalized samples.

12. The invention as defined in claim 1 wherein said determining step is performed multiple times, once for each one of said transmit antennas.

13. The invention as defined in claim 1 wherein said determining and applying steps are iterated multiple times over a symbol period, and iteration for each one of said transmit antennas, and said method further comprises, for each iteration, the steps of:
   generating a representation of signals that would have arrived had a particular symbol for a currently being processed transmit antenna had been transmitted; and
   subtracting said representation from said samples received for each receive antenna.

14. The invention as defined in claim 1 wherein said joint equalizer solution is one from the group consisting of: a joint least mean square (LMS) solution, a joint recursive least squares (RLS) solution, or a joint minimum intersymbol interference (ISI) subject to an anchor condition solution.

15. A receiver for use in a multiple-input multiple-output (MIMO) system in which a plurality of signal detectors receive signals transmitted by a plurality of signal sources, said receiver comprising:

a joint equalizer that develops a joint equalizer solution using channel information for at least one pairing of at least one of said signal sources and said signal detectors and received samples of at least two of said signal detectors and supplies as an output a signal that includes at least said joint equalizer solution applied to a signal received by at least one of said signal detectors;

a soft bit mapper for developing soft bits from said joint equalizer output; and a despreader interposed between said joint equalizer and said soft bit mapper.

16. The invention as defined in claim 15 wherein said joint equalizer solution is a joint minimum mean square error (MMSE) equalizer solution.

17. The invention as defined in claim 15 wherein said soft bit mapper further comprises an a posteriori probability (APP) metric processor.

18. The invention as defined in claim 15 wherein said soft bit mapper further comprises a spatial whitening unit.

19. The invention as defined in claim 15 where at least two of said transmit sources transmits signals at different rates.

20. The invention as defined in claim 15 wherein at least two of said transmit sources transmits signals using different transmit constellations.

21. The invention as defined in claim 15 further comprising:

a space time regenerator coupled to said joint equalizer; and a buffer-subtractor coupled between said signal detectors and said joint equalizer and between said space time regenerator and said joint equalizer.

22. The invention as defined in claim 21 further comprising a front end processor coupled to said buffer-subtractor.

23. The invention as defined in claim 1 further comprising an error correction decoder coupled to said soft bit mapper;

a space time regenerator coupled to said error correction decoder; and a buffer-subtractor coupled between said signal detectors and said joint equalizer and between said space time regenerator and said joint equalizer.

24. The invention as defined in claim 23 further comprising a front end processor coupled to said buffer-subtractor.

25. The invention as defined in claim 15 further comprising an order controller for determining an order in which signals from said signal detectors will be processed by said joint equalizer.

26. A receiver for use in a multiple-input multiple-output (MIMO) system in which a plurality of signal detectors receive signals transmitted by a plurality of signal sources, said receiver comprising:

a joint equalizer that develops a joint equalizer solution using channel information for at least one pairing of said at least one of said signal sources and said signal detectors and received samples of at least two of said signal detectors and supplies as an output a signal that includes at least said equalizer solution applied to a signal received by at least one of said signal detectors; and a soft bit mapper for developing soft bits from said joint equalizer output;

wherein said joint equalizer solution is a joint minimum mean square error (MMSE) equalizer solution and wherein said join equalizer further comprises:

a first plurality of fast Fourier transform processors, each of said fast Fourier transform processors being coupled to receive a respective input corresponding to a signal received by one of said signal detectors and supplying as an output a discrete frequency domain representation thereof;

a plurality of channel estimation units each of which is coupled to receive a is respective input corresponding to a signal received by one of said signal detectors which develops a channel estimate for each channel between each respective signal source and each respective signal detector;

a second plurality of fast Fourier transform processors, each of said second plurality of fast Fourier transform processors coupled to receive a respective input corresponding to a channel estimate for a respective one of said channels between said signal sources and said signal detectors and supplying as an output a discrete frequency domain representation thereof;

an MMSE detection per frequency bin processor coupled to receive as inputs said outputs from said first plurality of fast Fourier transform processors and from said second plurality of fast Fourier transform processors to produce a discrete frequency domain representation of an application of said joint minimum mean square error (MMSE) equalizer solution to said signals received by each of said signal detectors; and a plurality of inverse fast Fourier transform processors which convert said discrete frequency domain representation of an application of said joint minimum mean square error (MMSE) equalizer solution to the time domain.

27. The invention as defined in claim 26 wherein M is the number of signal sources and N is the number of signal detectors, and wherein said MMSE detection per frequency bin processor performs the equalization in the frequency domain by computing $z(\omega) = (H(\omega)^H H(\omega) + \sigma^2 I)^{-1} H(\omega)^H r(\omega)$ where $$H(\omega) = \begin{bmatrix} h_{1,1}(\omega) & \cdots & h_{1,M}(\omega) \\ \vdots & \ddots & \vdots \\ h_{N,1}(\omega) & \cdots & h_{N,M}(\omega) \end{bmatrix}$$

$$r(\omega) = \begin{bmatrix} r_1(\omega) \\ r_2(\omega) \\ \vdots \\ r_N(\omega) \end{bmatrix}$$

$$\sigma^2 = \frac{\sigma_n^2}{\sigma_x^2}$$

$\sigma^2$ is the background noise plus interference power, $\sigma_x^2$ is the sum of the power received by all said signal detectors from all of said signal sources, each $r(\omega)$ is said output of a one of said first plurality of first Fourier transform processors, each $h(\omega)$ is said output of a one of said second plurality of first Fourier transform processors, I is the identity matrix, $X^H$ means the Hermitian transpose of X, which is the complex conjugate transpose of the vector or matrix X, and z(ω) is the equalized output vector in the discrete frequency domain for frequency ω.

28. A receiver for use in a multiple-input multiple-output (MIMO) system in which a plurality of signal detectors receive signals transmitted by a plurality of signal sources, said receiver comprising:

a joint a equalizer that develops a joint equalizer solution using channel information for at least one pairing of said at least one of said signal sources and said signal detectors and received samples of at least two of said signal detectors and supplies as an output a signal that includes at least said equalizer solution applied to a signal received by at least one of said signal detectors; and a soft bit mapper for developing soft bits from said joint equalizer output;

wherein said joint equalizer solution is a joint minimum mean square error (MMSE) equalizer solution and wherein said joint equalizer further comprises:

a plurality of channel estimation units each of which coupled to receive a respective input corresponding to a signal received by one of said signal detectors which develops a channel estimate for each channel between each respective signal source and each respective signal detector;

a plurality of fast Fourier transform processors, each of said plurality of fast Fourier transform processors being coupled to receive a respective input corresponding to a channel estimate for a respective one of said channels between said signal sources and said signal detectors and supplying as an output a discrete frequency domain representation thereof;

an MMSE tap weight calculator coupled to receive as inputs said outputs from said plurality of fast Fourier transform processors to produce a discrete frequency domain representation of a joint minimum mean square error (MMSE) equalizer solution to said signals received by each of said signal detectors;

a plurality of inverse fast Fourier transform processors which convert said discrete frequency domain representation of a joint minimum mean square error (MMSE) equalizer solution to matrices of filter coefficients in the time domain; and a matrix finite impulse response (FIR) fitter coupled to apply said matrices of filter coefficients in the time domain to said signals received by said signal detectors.

29. The invention as defined in claim 28 wherein M is the number of signal sources and N is the number of signal detectors, and wherein said MMSE equalizer solution is developed by computing:

$$S(\omega)=(H(\omega)^H H(\omega)+\sigma^2 I)^{-1} H(\omega)^H$$

where $$H(\omega) = \begin{bmatrix} h_{1,1}(\omega) & \cdots & h_{1,M}(\omega) \\ \vdots & \ddots & \vdots \\ h_{N,1}(\omega) & \cdots & h_{N,M}(\omega) \end{bmatrix}$$

$$\sigma^2 = \frac{\sigma_n^2}{\sigma_x^2}$$

$\sigma_n^2$ is the background noise plus interference power, $\sigma_x^2$ is the sum of the power received by all said signal detectors from all of said signal sources, each h(ω) is said output of a one of said plurality of fast Fourier transform processors, I is the identity matrix, $X^H$ means the Hermitian transpose of X, which is the complex conjugate transpose of the vector or matrix X, and S(ω) is a frequency domain matrix representing the equalization for frequency ω.

30. The invention as defined in claim 29 wherein said matrix FIR filter applies said matrices of filter coefficients in the time domain to said signals received by said signal detectors by computing $$y(k) = \sum_{j=0}^{F-1} S_j r(k-j)$$

where y(k) is a vector output at time k, y having one component for each of said signal sources, $S_j$ is a M×N filter matrix for delay j, which is the inverse Fourier transform of S(ω), r(k) is a vector of received samples at time k, and F is the number of samples taken for each fast Fourier transform by each of said plurality of fast Fourier transform processors.

31. The invention as defined in claim 15 wherein said MIMO system is a wireless system, said signal sources are transmit antennas and said detectors are antennas of said receiver.

32. The invention as defined in claim 15 wherein said joint equalizer develops said joint equalizer solution as a function of estimates of the channels between each of said signal sources and said signal detectors.

33. The invention as defined in claim 15 wherein said joint equalizer develops and applies said joint equalizer solution in a time domain.

34. The invention as defined in claim 15 wherein said joint equalizer develops and applies said joint equalizer solution in a frequency domain.

35. The invention as defined in claim 16 wherein said joint equalizer develops and applies said joint equalizer solution in a discrete frequency domain and applies said joint minimum mean square error (MMSE) equalizer solution in a time domain.

36. The invention as defined in claim 16 wherein said joint equalizer develops said joint minimum mean square error (MMSE) equalizer solution by computing $$W = A(\Gamma(H))^H \left( (\Gamma(H))^H \Gamma(H) + \frac{\sigma_n^2}{\sigma_x^2} R_{pp} \right)^{-1}$$

where

Γ(H) is a MIMO convolution operator, $X^H$ means the Hermitian transpose of X, which is the complex conjugate transpose of the vector or matrix X, A is a delay matrix, $\sigma_n^2$ is the background noise plus interference power, $\sigma_x^2$ is the sum of the power received by all said signal detectors from all of said signal sources, noise covariance $R_{pp}$, and said joint equalizer applies said joint minimum mean square error (MMSE) equalizer solution by computing $y(k)=Wr(k)$ where r(k) is a vector of received samples at time k, and is y(k) is the vector output at time k representing the application of said joint minimum mean square error (MMSE) equalizer to said vector of received samples at time k.

37. The invention as defined in claim 15 wherein said joint equalizer solution is one from the group consisting of: a joint least mean square (LMS) solution, a joint recursive least squares (RLS) solution, or a joint minimum intersymbol interference (ISI) subject to an anchor condition solution.

38. A receiver for use in a multiple-input multiple-output (MIMO) system in which a plurality of receive antennas receive signals transmitted by a plurality of transmit antennas, said receiver comprising:

means for (i) developing a joint equalizer solution using channel information for at least one pairing of at least one of said transmit antennas and said receive antennas and said received samples of at least two of said receive antennas, said joint equalizer solution being developed at least partly in a frequency domain, and (ii) supplying as an output a signal that includes at least said joint equalizer solution applied to signal received by at least one of said receive antennas; and means for developing soft bits from said output signal.

* * * * *